United States Patent [19]

Harke et al.

[11] Patent Number: 5,800,910

[45] Date of Patent: Sep. 1, 1998

[54] PLASTIC MOLDED ARTICLES HAVING A POLYMER MATRIX FILLED WITH INORGANIC FILLERS

[75] Inventors: Stefan Harke, Sinsheim-Rohrbach; Stefanie Grathwohl, Oberderdingen; Rudolf Paternoster, Rinchnach; Thomas Wilhelm, Sulzfeld; Klaus Hock; Werner Fenzl, both of Regen, all of Germany

[73] Assignees: Blanco GmbH & Co. KG, Oberderdingen; Schock & Co. GmbH, Schorndorf, both of Germany

[21] Appl. No.: 705,109

[22] Filed: Aug. 28, 1996

[30] Foreign Application Priority Data

Mar. 4, 1994 [DE] Germany ............... 44 07 321.6

[51] Int. Cl.$^6$ ................................. B32B 5/16
[52] U.S. Cl. ................. 428/212; 428/220; 428/323
[58] Field of Search ............................. 428/212, 220, 428/323

[56] References Cited

U.S. PATENT DOCUMENTS 5,218,013  6/1993  Schock ........................ 523/209
5,366,619  11/1994  Terada et al. ................. 524/451
5,480,931  1/1996  Hock et al. .................. 524/449
5,665,795  9/1997  Koushima et al. ............. 523/223

FOREIGN PATENT DOCUMENTS 9307102  4/1993  WIPO.

Primary Examiner—H. Thi Le
Attorney, Agent, or Firm—Edward J. Timmer

[57] ABSTRACT

To improve the resistance to scratching of plastic molded articles comprising a polymer matrix filled with inorganic fillers, the filler content being 50 to 90% by weight in relation to the filled matrix, it is suggested that the filler comprise two filler fractions (a) and (b), wherein the filler fraction (a) has a particle size distribution with 98% by weight of the particles having a particle size ≦150 μm and is distributed essentially uniformly in the polymer matrix, and wherein the filler fraction (b) comprises particles having a particle size of approximately 300 μm to approximately 3000 μm, wherein the proportion of the filler fraction (b) is approximately 1 to 35% by weight of the total filler content, and wherein the proportion of the filler fraction (b) in an outer surface layer of the molded article is enriched to at least 30% by weight in relation to the total mass of the filled matrix.

18 Claims, No Drawings

PLASTIC MOLDED ARTICLES HAVING A POLYMER MATRIX FILLED WITH INORGANIC FILLERS

BACKGROUND OF THE INVENTION

The invention relates to plastic molded articles comprising a polymer matrix filled with inorganic fillers, the filler content being 50 to 90% by weight in relation to the filled matrix.

Plastic molded articles of the above-mentioned type are often used as functional parts for the kitchen and bathroom, in particular as kitchen sinks, worktops, washbasins, bathtubs etc.

With conventional plastic molded articles, it is attempted to distribute the inorganic fillers as uniformly as possible, seen over the layer thickness of the plastic molded article, in order to obtain homogeneous material properties of the material.

Examples of formulas for the manufacture of plastic molded articles of the type mentioned at the outset are to be found, for example, in DE 24 49 656 C2 or U.S. Pat. No. 3,827,933.

A quality feature of the functional parts used in the kitchen and bathroom is, inter alia, the scratch resistance of the surfaces which is a fundamental factor in determining the service life of such a functional part.

SUMMARY OF THE INVENTION

The object of the present invention is to design a plastic molded article of the type described at the outset such that an improved resistance to scratching is achieved.

This object is accomplished in accordance with the invention in that the filler material comprises two filler fractions (a) and (b), wherein the filler fraction (a) has a particle size distribution with 98% by weight of the particles having a particle size $\leq 150$ μm and is distributed essentially uniformly in the polymer matrix, and wherein the filler fraction (b) comprises particles having a particle size of approximately 300 μm to approximately 3000 μm, in that the proportion of the filler fraction (b) is approximately 1 to 35% by weight of the total filler content, and in that the proportion of the filler fraction (b) in an outer surface layer of the molded article is enriched to at least 30% by weight in relation to the total mass of the filled matrix.

DESCRIPTION OF THE PREFERRED EMBODIMENTS

Typical fillers for both filler fractions are, for example, cristobalite, quartz, aluminum trihydroxide and other fillers already known from filled plastic molded articles.

Although the choice of the fillers for the filler fractions (a) and (b) is not so critical, the fillers of the fraction (a) are preferably selected from the group (a) cristobalite, quartz, tridymite, glass, enamel frits, aluminum oxide, aluminum trihydrate, kaolin, magnesium silicate, granite, zirconium oxide, and the fillers of the fraction (b) preferably from the group (b) cristobalite, quartz, tridymite, glass, enamel frits, corundum beads, ceramic beads.

A clearly improved resistance to scratching of the surfaces of the plastic molded articles results surprisingly and essentially irrespective of the type of filler when a second filler fraction (b) having essentially coarser particles is used in addition to a filler fraction with a fine filler (a).

During production, care is taken to ensure that the filler fraction having the coarser particles can be enriched in the outer surface layer of the molded article, which obviously results in a type of reinforcing effect. Herein the improvement in the scratch resistance is not based on the fact that the coarse filler particles in the outer surface layer reach as far as the outermost surface but that the particles are preferably prevented from settling right up to the surface itself. A "reinforced layer" with an increased proportion of the filler fraction (b) is then formed beneath a very thin outermost layer.

A particularly striking effect is achieved with filler particles of the filler fraction (b) when these particles are essentially granular, in particular essentially spherical particles.

A filler which has proven to be particularly suitable as filler fraction (a) is one in which the particle size distribution is selected such that more than 95% by weight of the fraction has a particle size <120 μm and, further preferred, more than 50% by weight a particle size <50 μm.

Even if the filler content of the plastic molded articles is rather kept at the lower limit of the total filler content, it is recommendable for the total filler content in the outer surface layer to be enriched to more than 70% by weight since a particularly striking increase in the scratch resistance of the surface is then observed.

The proportion of the filler fraction (b) in the total filler content of the outer surface layer is preferably 30% by weight or more. Further preferred is a proportion of the filler fraction (b) in the total filler content of the outer surface layer of 50% by weight or more.

On the other hand, it can be of advantage, depending on the purpose for which the molded articles are used, for essentially no portions of the filler fraction (b) to be present in layers of the molded article remote from the outer surface layer. In other words, the filler fraction (a) is present in these regions of the plastic molded article essentially alone as filler material and gives these parts of the plastic molded article the advantageous properties which are already known from plastic molded articles made from the compositions according to the state of the art.

The outer surface layer is to be understood as a layer which represents the used side of the plastic molded articles and which, measured from the surface, is approximately 3 mm, preferably 2 mm, thick. The maximum filler distribution in the plastic molded article is preferably found at approximately 1 mm distance from the surface of the molded article. If a particle size clearly exceeding 1000 μm is used in the filler of the fraction (b), the thickness of the outer surface layer is to be adjusted to 1.5 to 2 times the coarsest particles of the fraction (b).

The outermost surface layer mentioned above, which is essentially not filled with filler particles of the fraction (b), is normally only a few μm, i.e. normally 1–50 μm, preferably 10–25 μm.

Preferable weight ratios of the proportions of the filler fraction (a) to the proportion of the filler fraction (b) are from approximately 95:5 to approximately 65:35.

The filler particles are preferably used in a silanized form. This facilitates and improves the binding of the filler particles to the surrounding polymer matrix.

The polymer matrix itself can be formed from a plurality of standard polymer materials, e.g. polyesters, acrylate polymers or epoxide polymers, with acrylate polymers and epoxide polymers being preferred. Acrylate polymers are to be understood as polymers on the basis of the derivatives of acrylic acid, including alkyl-substituted acrylic acid derivatives, in particular their esters.

During the production of the inventive plastic molded articles, which is preferably carried out in the casting process, it is to be ensured that the viscosity of the molding composition is adjusted such that sedimentation of the filler fraction (b), which is initially distributed in the molding composition essentially homogeneously, can take place during the curing process and the formation of the polymer matrix to an adequate extent. This can, for example, be regulated simply via the amount of prepolymer added.

If, for example, acrylate polymers are used, it has proven to be advantageous to use a prepolymer having a normal relative molar mass of approximately 50,000 to 250,000 with a proportion of approximately 10 to 30% by weight, preferably 15 to 23% by weight, each in relation to the total polymer proportion of the molded article, so that the desired sedimentation and enriching effect takes place, depending on the particle size of the fraction (b). This corresponds to syrup viscosities of approximately 30–2,000 mpas, preferably 60–300 mpas. The specified viscosities are valid, where nothing else is indicated, for a temperature of 20° C.

In addition, the particle shape and size of the two filler fractions consisting of inorganic filler are of significance for adjusting the viscosity.

When using high pigment proportions, in particular, in the casting composition, it is possible that the viscosity of the casting composition will be increased so greatly that sufficient sedimentation in the cycle time desirable for the production of the molded articles is not always ensured.

In this case, particles of the filler fraction (b) coated with pigments can be used successfully. Pigments can then be omitted in the composition itself to a great extent or completely. Furthermore, the inventive enriching effect in the outer surface layer results in the case of the pigment-coated filler particles in a concentration of the pigments in the outer surface layer, i.e. on the visible side of the molded article, and, therefore, considerably fewer pigment materials are required to achieve the same deep color impression. The sedimentation characteristics of the pigment-coated fillers are no worse than those of the uncoated fillers since, in this case, "free" pigment in the composition can be dispensed with.

Since the state of the art for filled polymer materials has so far always tried to counteract the problem of separation or the sedimentation of at least portions of the fillers in order to attain good product characteristics, the present invention has the surprising effect that quite specific advantages result for the scratch resistance of the surface of the plastic molded articles with a partial separation or a partially inhomogeneous distribution of the fillers in the polymer matrix.

The scratch resistance is, in the present context, defined and understood in accordance with the following test procedure:

Scratches were made with increasing loads of 1 to 10 newtons in a sample of a molded article surface by means of a hardness and adhesion tester (model 413 of the Erich Senn company, Hemer, Germany), with the aid of a diamond needle having a 90° cone. The depth of these scratches was measured with a peak-to-valley measuring device (model T 2000 with linear feed unit LV 50 of the Hommel-Werke company, Villingen-Schwenningen, Germany) and plotted against the load. The inventive molded articles having the uneven distribution of the filler fraction (b) display a considerably shallower depth for the scratches which can be made than in the case of the molded articles obtained in accordance with the comparative examples described below.

These and further advantages of the invention will be explained in greater detail in the following on the basis of the examples and comparative examples.

EXAMPLES

COMPARATIVE EXAMPLE 1

1.8 kg of PMMA of a normal type in the molecular weight range of 50,000–250,000 is dissolved in 8.2 kg of MMA and mixed with mold releasing agent and cross linker. It is then adjusted to a filler content of 63% by weight with 17 kg of cristobalite and quartz powder (in this case, cristobalite powder with particles <150 µm silanized in the particle size distribution of 5% by weight ≧100 µm, 42% by weight ≧32 µm). After peroxides have been added, polymerization takes place in suitable, typical kitchen sink molds. The scratch resistance according to the above specification was determined from a sample of the bottom of the basin in the kitchen sink:

| Load (n)   | 10 | 9  | 8  | 7  | 6 | 5 | 4 | 3 |
|------------|----|----|----|----|---|---|---|---|
| Depth (µm) | 16 | 15 | 13 | 12 | 8 | 4 | 2 | 2 |

The filler material having a weight proportion of 63% is distributed for the most part uniformly over the sink thickness.

EXAMPLE 1

1.8 kg of PMMA of a normal type in the molecular weight range of 50,000–250,000 is dissolved in 8.0 kg of MMA and mixed with mold releasing agent and 0.2 kg of cross linker. 15.3 kg of cristobalite or quartz powder (in this case, cristobalite powder in the particle size distribution specified in Comparative Example 1) are added as filler fraction (a). In addition, a total filler content of 63% by weight is set with a round or fragmented sand or with round, coarse glass beads (in this case coated, round quartz sand, type ⅛ SIG silanized of the Dorfner company in Amberg/Germany, 1.7 kg in the particle size distribution of at least 95% by weight >300 µm, at the most 15% by weight >700 µm) as filler fraction (b). After peroxides have been added, polymerization takes place in suitable molds. The scratches made in the bottom of the basin of the molded article are measured with respect to their depth:

| Load (n)   | 10 | 9 | 8 | 7 | 6 | 5 | 4 | 3 |
|------------|----|---|---|---|---|---|---|---|
| Depth (µm) | 10 | 9 | 7 | 6 | 5 | — | — | — |

— = not measurable

The total filler proportion is not evenly distributed. To establish this, the sample of the bottom of the basin (which constitutes the region most subject to scratching) is cut in slices of 1 mm thickness parallel to the surface so the filler proportion (fine and coarse) can be determined over the thickness of the sink and also the ensuing ratio of fine and coarse filler through a screen.

The following results are ascertained:

| Range of Thickness | Filler Proportion Total (% by wt.) | Coarse Proportion of Filler Proportion* (% by wt.) |
|---|---|---|
| 0–1 mm | 82.6 | 62.1 |
| 2–3 mm | 65.4 | 11.1 |
| 4–5 mm | 60.6 | 1.1 |
| 6–7 mm | 60.4 | 0.8 |
| 8–9 mm | 61.2 | 1.1 |

| Range of Thickness | Filler Proportion Total (% by wt.) | Coarse Proportion of Filler Proportion* (% by wt.) |
|---|---|---|
| 9–10 mm | 55.8 | 1.1 |

*The coarse proportion of the filler proportion is to be understood as the proportion of the total filler which remains on the screen during screening with a cut-off at 300 μm.

Obviously it was possible to enrich almost the entire coarse proportion in the layer of the first mm and so it is noticeable, apart from the extremely high filler proportion of 83% by weight, that the coarse proportion of the filler proportion is over 60% by weight. In relation to the total formula, the filler proportion is only 63% by weight and the coarse proportion of the filler proportion only 10% by weight.

EXAMPLE 2

1.8 kg of PMMA of a normal type in the molecular weight range of 50,000–250,000 is dissolved in 8.0 kg of MMA and mixed with mold releasing agent and 0.2 kg of cross linker. 17.4 kg of cristobalite or quartz powder are then added, as in Comparative Example 1. In addition, a total filler content of 64% by weight is set with a round or fragmented sand or with round, coarse glass beads (in this case coated, round quartz sand, as in Example 1, 0.73 kg). After peroxides have been added, polymerization takes place in suitable molds. The depth of the scratches made is measured with the peak-to-valley measuring device:

| Load (n) | 10 | 9 | 8 | 7 | 6 | 5 | 4 | 3 |
|---|---|---|---|---|---|---|---|---|
| Depth (μm) | 10 | 6 | 8 | 6 | — | — | — | — |

— = not measurable

The following results are ascertained when establishing the filler proportions over the sink thickness:

| Range of Thickness | Filler Proportion Total (% by wt.) | Coarse Proportion of Filler Proportion* (% by wt.) |
|---|---|---|
| 0–1 mm | 77.2 | 50.9 |
| 2–3 mm | 62.6 | 6.5 |
| 4–5 mm | 62.5 | 1.2 |
| 6–7 mm | 60.3 | 0.9 |
| 8–9 mm | 60.4 | 1.1 |
| 9–10 mm | 57.2 | 1.3 |

*The coarse proportion of the filler proportion is to be understood as the proportion of the total filler which remains on the screen during screening with a cut-off at 300 μm.

Obviously it was again possible to enrich almost the entire coarse proportion in the layer of the first mm and so it is noticeable, apart from the very high filler proportion of 77% by weight, that the coarse proportion of the filler proportion is 50% by weight. In relation to the total formula, the total filler proportion is only 64% by weight and the coarse proportion of the filler proportion only 4% by weight.

EXAMPLE 3

1.8 kg of PMMA of a normal type in the molecular weight range of 50,000–250,000 is dissolved in 8.2 kg of MMA and mixed with mold releasing agent and cross linker. 13.6 kg of cristobalite or quartz powder are then added, as in Comparative Example 1. In addition, a total filler content of 63% by weight is set with a round or fragmented sand or with round, coarse glass beads (in this case coated, round quartz sand, as in Example 1, 3.4 kg). After peroxides have been added, polymerization takes place in suitable molds. The scratch resistance values are indicated in the following:

| Load (n) | 10 | 9 | 8 | 7 | 6 | 5 | 4 | 3 |
|---|---|---|---|---|---|---|---|---|
| Depth (μm) | 10 | 8 | 7 | 5 | 2 | — | — | — |

— = not measurable

The following results are ascertained when establishing the filler proportions over the sink thickness:

| Range of Thickness | Filler Proportion Total (% by wt.) | Coarse Proportion of Filler Proportion* (% by wt.) |
|---|---|---|
| 0–1 mm | 77.7 | 60.7 |
| 2–3 mm | 67.6 | 35.5 |
| 4–5 mm | 62.7 | 20.8 |
| 6–7 mm | 52.0 | 6.1 |
| 8–9 mm | 57.3 | 1.3 |
| 9–10 mm | 56.0 | 1.2 |

*The coarse proportion of the filler proportion is to be understood as the proportion of the total filler which remains on the screen during screening with a cut-off at 300 μm.

Obviously it was possible to enrich the coarse proportion to a greater extent in the upper half of the sink and so it is noticeable, apart from the very high filler proportion of 77% by weight, that the coarse proportion of the filler proportion is 60% by weight. In relation to the total formula, the filler proportion is only 63% by weight and the coarse proportion of the filler proportion only 31% by weight.

COMPARATIVE EXAMPLE 2

1.8 kg of PMMA of a normal type in the molecular weight range of 50,000–250,000 is dissolved in 8.0 kg of MMA and mixed with mold releasing agent and 0.2 kg of cross linker. 27.1 kg of cristobalite or quartz powder are then added, as in Comparative Example 1, as fraction (a). In addition, a total filler content of 76% by weight is set with a round or fragmented sand or with round, coarse glass beads as fraction (b) (in this case, coated, round quartz sand, as in Example 1, 5.2 kg). After peroxides have been added, polymerization takes place in suitable molds. The depth of the scratches made in the bottom of the basin of the molded article is determined with a peak-to-valley measuring device:

| Load (n) | 10 | 9 | 8 | 7 | 6 | 5 | 4 | 3 |
|---|---|---|---|---|---|---|---|---|
| Depth (μm) | 14 | 8 | 9 | 7 | 6 | 5 | 3 | 2 |

Obviously, the scratch resistance in this case is no longer clearly better than in the Comparative Example 1, in particular the values are worse than for example formulas having a smaller proportion of coarse filler.

The following results are ascertained when establishing the filler proportions over the sink thickness:

| Range of Thickness | Filler Proportion Total (% by wt.) | Coarse Proportion of Filler Proportion* (% by wt.) |
| --- | --- | --- |
| 0–1 mm | 76.3 | 13.8 |
| 2–3 mm | 76.0 | 10.7 |
| 4–5 mm | 76.2 | 11.6 |
| 6–7 mm | 73.1 | 11.0 |

*The coarse proportion of the filler proportion is to be understood as the proportion of the total filler which remains on the screen during screening with a cut-off at 300 μm.

EXAMPLES 4 AND 5

In a casting composition having the ingredients of Example 1, the proportion of the filler fraction (b) in the total filler content was set at 1% by weight in the one case (Example 4) and at 35% by weight in the other (Example 5) with the same selection of components. The polymerization of the composition in a mold was carried out in accordance with the Comparative Example 1, and likewise the subsequent scratch resistance test. The following values were ascertained:

Example 4:

| Load (n) | 10 | 9 | 8 | 7 | 6 | 5 |
| --- | --- | --- | --- | --- | --- | --- |
| Depth (μm) | 15 | 12 | 11 | 9 | 8 | 5 |

Example 5: The depth of the scratches was too slight to be measured at any bearing load up to and including 10 n.

Obviously, in this case, it was possible to avoid sedimentation with respect to the filler fraction (b). The very high filler proportion of 76% by weight is uniformly distributed over the entire sink thickness, also the coarse proportion is uniformly distributed, apart from a slight enrichment on the rear side. Mathematically, the coarse proportion on the visible side which is subject to scratching is merely approximately 14% by weight in relation to the filler proportion, or approximately 10% by weight in relation to the total mass. The proportions on the visible side correspond to a great extent to those of the overall sink thickness. Owing to the lack of selective settling, no sufficiently improved scratch resistance can be achieved.

We claim:

1. Plastic molded article comprising a polymer matrix filled with inorganic fillers and having a visible outer surface, wherein the filler content is 50 to 90% by weight in relation to the filled matrix, wherein the filler material comprises two filler fractions (a) and (b), wherein the filler fraction (a) has a particle size distribution with 98% by weight of the particles having a particle size less than or equal to 150 μm and is distributed essentially uniformly in the polymer matrix, and wherein fraction (b) comprises particles having a particle size of approximately 300 to 3000 μm, further comprising the proportion of the filler fraction (b) is approximately 1 to 35% by weight of the total filler content, and the proportion of the filler fraction (b) in an outer surface layer of the molded article having a thickness of about 3 millimeters or less as measured from said outer surface is enriched to at least 30% by weight in relation to the total mass of the filled matrix.

2. Plastic molded article as defined in claim 1, wherein the filler particles of the filler fraction (b) are essentially granular particles.

3. Plastic molded article as defined in claim 1, wherein more than 50% by weight of the filler fraction (a) has a particle size <50 μm.

4. Plastic molded article as defined in claim 1, wherein the total filler content in the outer surface layer is at least partially more than 70% by weight.

5. Plastic molded article as defined in claim 1, wherein the proportion of the filler fraction (b) in the total filler content of the outer surface layer is 30% by weight or more.

6. Plastic molded article as defined in claim 5, wherein the proportion of the filler fraction (b) in the total filler content of the outer surface layer is 50% by weight or more.

7. Plastic molded article as defined in claim 1, wherein essentially no portions of the filler fraction (b) are present in layers remote from the outer surface layer.

8. Plastic molded article as defined in claim 1, wherein the thickness of the outer surface layer is less than 3 mm.

9. Plastic molded article as defined in claim 1, wherein the weight ratio of the proportion of the filler fraction (a) to the proportion of the filler fraction (b) is from 95:5 to 65:35.

10. Plastic molded article as defined in claim 1, wherein the filler particles are silanized.

11. Plastic molded article as defined in claim 1, wherein the particles of the filler fraction (b) are coated with a composition containing pigments.

12. Plastic molded article as defined in claim 1, wherein the polymer matrix is formed from an acrylic polymer.

13. Plastic molded article as defined in claim 12, wherein the polymer matrix is formed from a prepolymer syrup in the form of a solution of 8–30% by weight of polymethylmethacrylate having a normal relative molar mass of 50,000 to 250,000 in methylmethacrylate.

14. Plastic molded article as defined in claim 1, wherein the polymer matrix is formed from an epoxide polymer.

15. Plastic molded article as defined in claim 13, wherein the prepolymer syrup contains 15–23% by weight of the polymethylmethacrylate.

16. Plastic molded article as defined claim 1 wherein the polymer matrix is formed from a curable composition consisting of one or several monomers and, optionally, prepolymer components, the viscosity of the curable composition being set at a temperature of 20° C. to approximately 30–2,000 mpas.

17. Plastic molded article as defined in claim 16 wherein the viscosity is 60–300 mPa.s.

18. Plastic molded article comprising a polymer matrix filled with inorganic fillers and having a visible outer surface, wherein the filler content is 50 to 90% by weight in relation to the filled matrix, wherein the filler material comprises two filler fractions (a) and (b), wherein the filler fraction (a) has a particle size distribution with 98% by weight of the particles having a particle size less than or equal to 150 μm and is distributed essentially uniformly in the polymer matrix, and wherein fraction (b) comprises particles having a particle size of approximately 300 to 3000 μm, further comprising the proportion of the filler fraction (b) is approximately 1 to 35% by weight of the total filler content, and the proportion of the filler fraction (b) in an outer surface region of the molded article disposed beneath and proximate said outer surface is enriched to at least 30% by weight in relation to the total mass of the filled matrix.

* * * * *

UNITED STATES PATENT AND TRADEMARK OFFICE
CERTIFICATE OF CORRECTION

PATENT NO : 5,800,910

DATED : September 1, 1998

INVENTOR(S): Stephan HARKE et al.

It is certified that error appears in the above-identified patent and that said Letters Patent is hereby corrected as shown below:

Col. 3, line 17, replace "mpas" with ---mPa•s---.

Col. 3, line 18, replace "mpas" with ---mPa•s---.

Col. 8, line 6, delete "partially".

Col. 8, line 43, replace "mpas" with ---mPa•s---.

Col. 8, line 45, replace "mpas" with ---mPa•s---.

Signed and Sealed this

Twenty-eighth Day of December, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO : 5,800,910

DATED : September 1, 1998

INVENTOR(S): Stephan HARKE et al.

It is certified that error appears in the above-identified patent and that said Letters Patent is hereby corrected as shown below:

On title page, item [63] Related U.S. Application Data:
   Insert "Continuation of PCT/EP95/00796 March 4, 1995"

Signed and Sealed this

Fourth Day of July, 2000

Attest:

Q. TODD DICKINSON

Attesting Officer

Director of Patents and Trademarks